able sheet metal and projecting radially
UNITED STATES PATENT OFFICE.

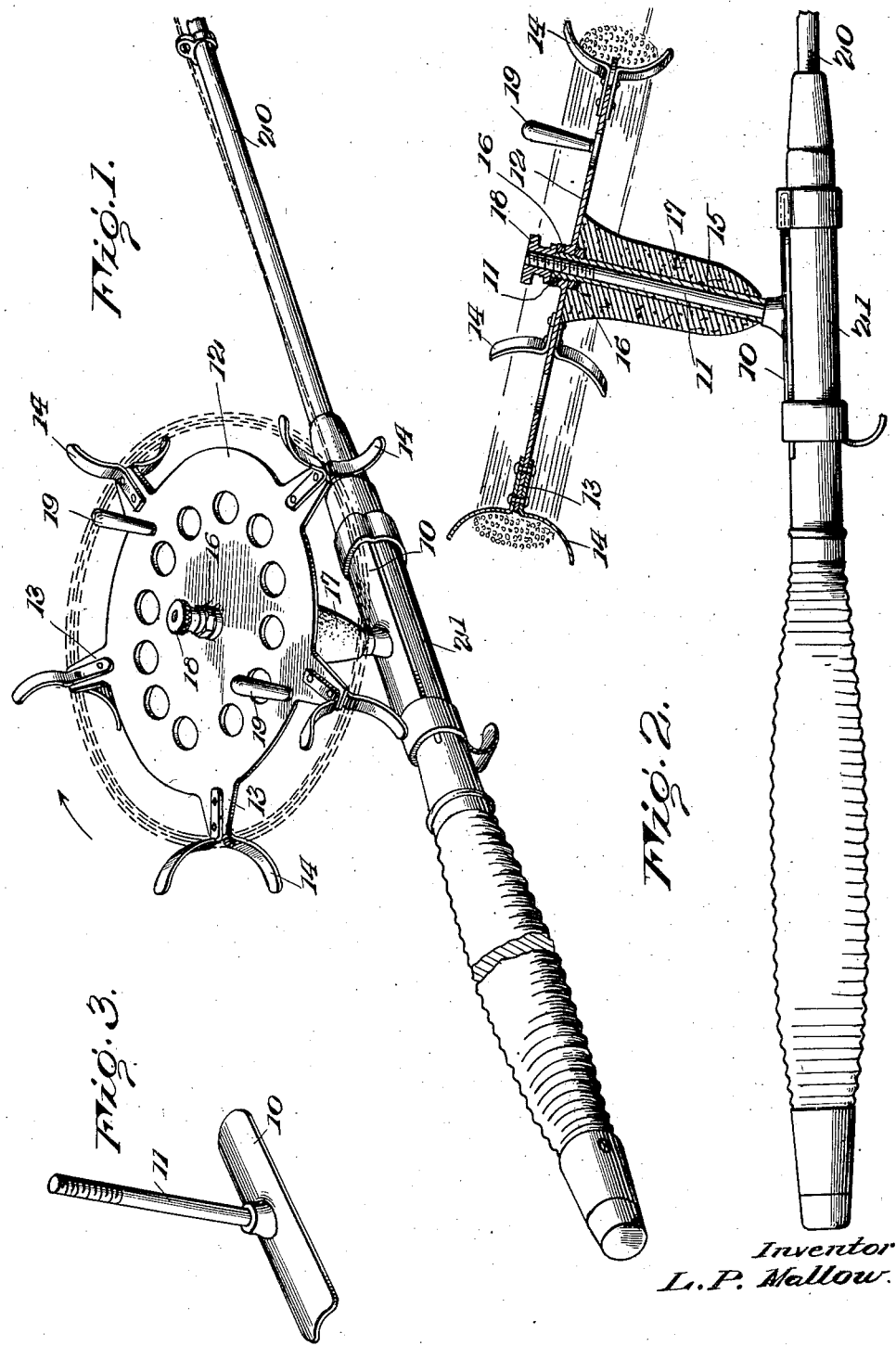

LEWIS P. MALLOW, OF LAONA, WISCONSIN.

FISHING-REEL.

1,358,382.  Specification of Letters Patent.  Patented Nov. 9, 1920.

Application filed October 15, 1919. Serial No. 330,764.

*To all whom it may concern:*

Be it known that I, LEWIS P. MALLOW, a citizen of the United States, residing at Laona, in the county of Forest and State of Wisconsin have invented certain new and useful Improvements in Fishing-Reels, of which the following is a specification.

This invention relates to an improved fishing reel and has one of its principal objects to provide a reel especially adapted for casting.

The invention has as a further object to provide a reel which may be easily snubbed and wherein the reel may be operated for quickly taking up the line to avoid the occurrence of slack therein.

A still further object of the invention is to provide a reel which will minimize back lashing of the line.

And the invention has as a still further object to provide a reel so constructed that the line thereon may readily dry.

Other and incidental objects will appear hereinafter. In the drawings:

Figure 1 is a perspective view showing my improved reel applied to a conventional type of fishing rod, Fig. 2 is a side elevation, the reel being shown in section, and Fig. 3 is a detail perspective view showing the base plate and supporting post of the reel.

In carrying the invention into effect, I employ a transversely curved base plate 10 from which rises a supporting post or spindle 11. As particularly brought out in Fig. 2, the post is inclined or tilted forwardly with respect to the plate. Mounted to rotate upon the supporting post is a horizontally disposed reel body 12. This reel body may be constructed from a disk of suitable sheet metal and projecting radially from the periphery of the disk at equally spaced points thereabout is a plurality of lugs 13. Mounted upon these lugs are line receiving forks or crotches. These forks are each constructed of a pair of oppositely curved resilient arms 14 suitably secured at their inner end portions to opposite sides of the lugs, the forks being preferably five in number although this detail may, of course, be varied as desired. Extending laterally from the reel body at a point axially thereof is a hub sleeve 15 which may, if desired, be threaded through the reel body and threaded upon the upper end portion of the sleeve to seat against the upper and lower faces of the reel body are nuts 16 detachably connecting the sleeve with the hub body. Surrounding the hub sleeve to coöperate therewith in forming the hub of the reel is a hub facing 17. This facing may be formed of rubber or, if preferred, suitable tape may be wound around the sleeve to provide the facing. As particularly brought out in Fig. 2, the hub sleeve is adapted to freely receive the supporting post 11 therethrough so that the reel body is thus journaled upon the post and threaded upon the upper end of the post is a thumb nut 18 detachably securing the reel body upon the post. In this connection it is to be observed that the base plate 10 is formed with an upstanding boss at the lower end of the post and the sleeve 15 rests against this boss to be supported thereby. Consequently, the sleeve will serve to space the reel body above the base plate 10. Swiveled upon the reel body, preferably at diametric points thereon, are upstanding handles 19. A pair of handles is preferably employed and either of said handles may, of course, be grasped for turning the reel body.

In the drawing, I have shown my improved reel mounted upon a conventional type of fish rod 20 having the usual reel seat 21 and, as will be observed, the base plate 10 of my improved reel is adapted to fit said seat so that the reel may thus be readily connected to or detached from the rod. When thus applied, it will be noted that owing to the inclination of the supporting post 11, the reel body 12 is tilted downwardly and forwardly toward the rod. Consequently, the line receiving forks of the reel will, as suggested in Fig. 1, lie in a plane with the reach of the line extending from the reel body to the first of the guides upon the rod 20. As will accordingly be seen, when the reel body is turned, the line will be wound around the line receiving forks of the body and owing to the effective diameter of the body, the line may be taken up or reeled in with rapidity. Under all ordinary circumstances, the occurrence of slack in the line may thus be avoided. In this connection, it is to be observed that in employing the supporting post 11 and hub sleeve 15 as a mounting for the reel body, the reel body will not turn with undue rapidity when a cast is made so as to cause back lashing of the line while, at the same time, the reel body may, nevertheless, be readily rotated by means of either of the handles 19. For snubbing the reel body when casting it is simply necessary to press the thumb and one finger of the hand against the hub facing 17. A line wound upon the reel will be exposed on all sides thereof to the air. Consequently, the line may readily dry. The practical advantages of this feature of the present device will be particularly appreciated when it is considered that with the ordinary type of reel it is necessary to unreel the line for drying. I accordingly provide a particularly effective construction for the purpose set forth and a reel which may be readily applied to and operated upon substantially any conventional type of fishing rod.

Having thus described the invention, what is claimed as new is:

A reel including a spindle, a reel body, a hub sleeve journaled upon the spindle and fitted through the reel body, nuts threaded upon the sleeve to coact with opposite sides of the reel body for rigidly connecting the reel body with said sleeve, and a hub facing about the sleeve locking the lowermost of said nuts.

In testimony whereof I affix my signature.

LEWIS P. MALLOW. [L. S.]